United States Patent [19]

Chee

[11] Patent Number: 4,603,822
[45] Date of Patent: Aug. 5, 1986

[54] AFT ENGINE MOUNT
[75] Inventor: Wan T. Chee, Bellevue, Wash.
[73] Assignee: The Boeing Company, Seattle, Wash.
[21] Appl. No.: 578,072
[22] PCT Filed: Dec. 8, 1983
[86] PCT No.: PCT/US83/01931
§ 371 Date: Dec. 8, 1983
§ 102(e) Date: Dec. 8, 1983
[87] PCT Pub. No.: WO85/02596
PCT Pub. Date: Jun. 20, 1985
[51] Int. Cl.$^4$ .................................................. B64D 27/00
[52] U.S. Cl. ........................................ 244/54; 248/554
[58] Field of Search ........................ 244/53 R, 54, 55; 60/39.31; 248/554, 555

[56] References Cited

U.S. PATENT DOCUMENTS

| | | | |
|---|---|---|---|
| 3,318,554 | 5/1967 | Ward et al. | 244/54 |
| 3,397,855 | 8/1968 | Newland | 244/54 |
| 3,727,862 | 4/1973 | Kaufhold et al. | 244/54 |
| 3,750,983 | 8/1973 | Morris | 244/54 |
| 3,809,340 | 5/1974 | Dolgy et al. | 244/54 |
| 4,044,973 | 8/1977 | Moorehead | 244/54 |

FOREIGN PATENT DOCUMENTS

| | | | |
|---|---|---|---|
| 628496 | 8/1949 | United Kingdom | 248/554 |
| 2049817 | 12/1980 | United Kingdom | 244/54 |

Primary Examiner—Trygve M. Blix
Assistant Examiner—Rodney Corl
Attorney, Agent, or Firm—Christensen, O'Connor, Johnson & Kindness

[57] ABSTRACT

In an aircraft having a jet engine mounted to and beneath a wing thereof wherein the engine is a predetermined distance from the wing and wherein further the engine is mounted on a strut affixed to the wing, a low-profile engine mount assembly is attachable to the strut and the engine to hold the engine on the strut. The engine mount assembly is constructed and arranged to occupy a minimum portion of the distance between the engine and the wing so as to provide the maximum strut vertical dimension (depth), thereby providing significant benefit in length-to-stiffness ratio in the strut. The engine mount is further constructed and arranged to accommodate longitudinal growth of the engine due to thermal expansion and includes a yoke assembly having a first arm and a second arm, the yoke being mounted to the strut so as to permit pivotal movement of the yoke about an axis substantially orthogonal to the engine axis. The first and second arms of the yoke are mounted to an engine-mounting ring affixed to the engine. A first ink is pivotally attached at its first end to the first arm and pivotally attached at its second end to the engine-mounting ring. A second link is pivotally attached at a first end to the second arm and pivotally attached at the second end to the engine-mounting ring. The first ends of the links are pivotable about axes substantially parallel to the engine axis, while the second ends of the links are substantially universally pivotable, preferably being mounted by means of spherical bearings to the engine-mounting ring. A third link is connected between the yoke and the engine-mounting ring intermediate the attachment points of the first and second links. Both ends of the third link have spherical bearings associated therewith to provide pivotal attachment of the third link to the yoke and mounting ring. The engine mount is constructed and arranged to provide for an optimum angle of the first and second links with respect to the horizontal so as to react against vertical, side and seizure (torque) loads on the engine, however, the pivotal attachment of the yoke to the strut permits the links to be short enough to remain within the cowl outline surrounding the engine to increase aerodynamic efficiency of the cowl structure.

11 Claims, 5 Drawing Figures

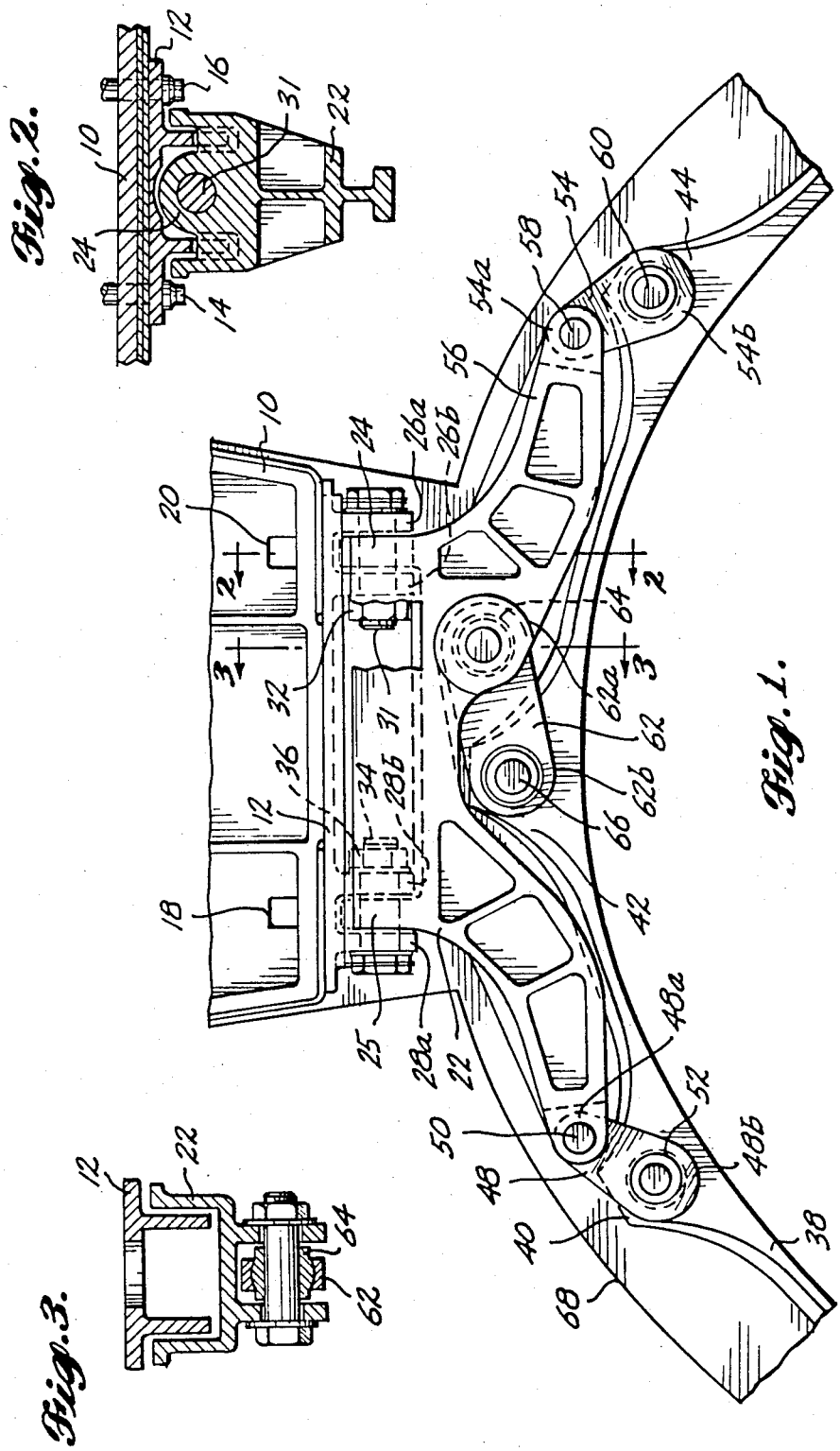

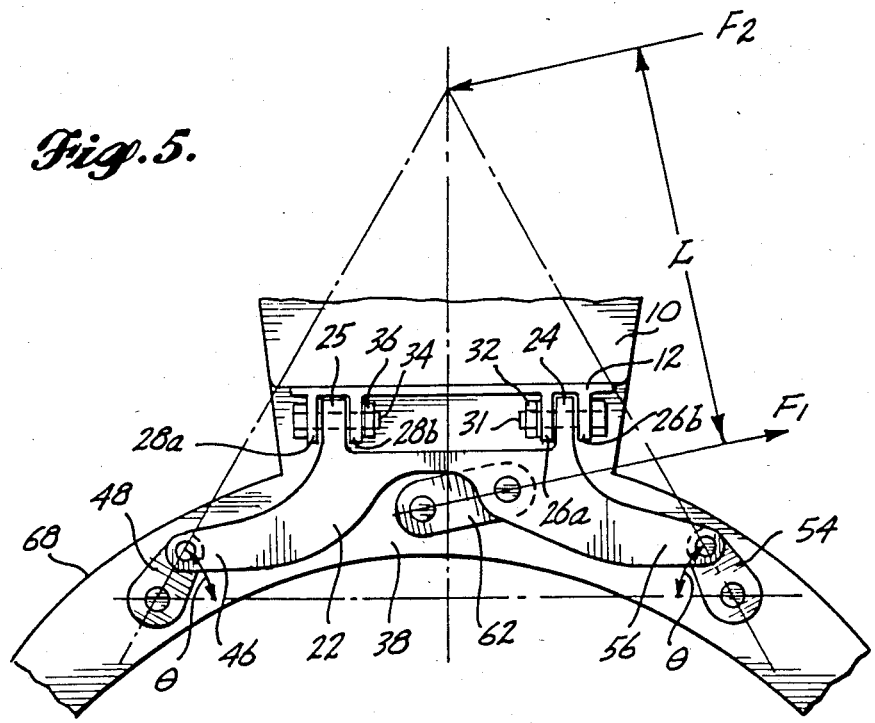
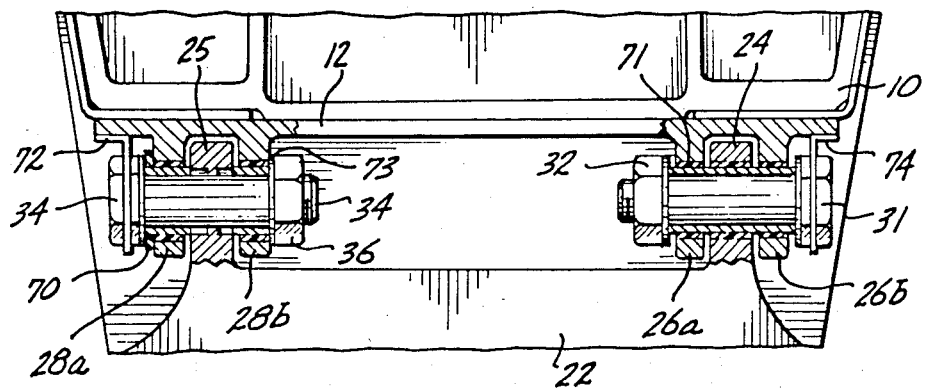

4,603,822

AFT ENGINE MOUNT

BACKGROUND OF THE INVENTION

This invention relates to engine mounts for jet aircraft engines and more particularly relates to an aft engine mount that is stiff enough to provide support for the engines while accommodating thermal growth of the engine.

Typically, a jet engine is mounted beneath the wing of a commercial airliner by forward and aft engine mounts attached to struts affixed to and extending downwardly from the wing structure. The forward mount is typically rigid and thermal expansion of the engine, both radially and longitudinally, is accounted for in the aft engine mount. The aft engine mount is generally also designed to react against vertical, side, and engine seizure (torque) loads. Using previous engine mount designs, the engine mount many times exceeds the external dimensions of the cowl surrounding the engine. In such cases it is necessary to provide a local blister fairing over the engine mount fittings. Such a fairing "bump" on the cowl causes interference effects and blowing drag penalty in the engine fan exits and the wing lower surface. In some cases, the bump is as high as 2.4 inches and exhibits considerable drag on the aircraft. In addition, the construction of the cowl is complicated by the addition of the blister fairing.

The distance between the engine and the wing is fixed in the initial aircraft design and the space must be shared by the engine-mounting struts and the engine mount. The space restriction caused by the design of the aircraft tends to make the strut shallow so that any increases in the vertical height of the strut will pay off well in terms of the stiffness-to-weight ratio of the strut structure. Therefore, it is desirable that the engine mount fittings be made as low-profile as possible without sacrificing load handling and other requirements in order to both fit the engine mount within the cowl contour and also to permit as deep an engine-mounting strut as possible in the space between the engine and the wing.

It is therefore an object of the present invention to provide a low-profile aft engine mount that tolerates thermal growth of the engine.

It is a further object of this invention to provide such an aft engine mount that permits a maximum depth engine strut to be utilized in a predetermined amount of space between the engine and the wing.

It is another object of this invention to provide such an aft engine mount that meets all the usual requirements of load handling, ease of manufacture, ease of installation, and maintenance.

SUMMARY OF THE INVENTION

In accordance with the above-stated objects, an engine mount for use in a position at the aft end of the core of a jet engine which is mounted to and beneath a wing of the aircraft, is provided. In aircraft design, the engine is located a predetermined distance from the wing and the present invention contemplates a low-profile engine mount that attaches to an engine-mounting strut, which in turn is affixed to aircraft wing structure. The low-profile mount of the present invention occupies a minimum amount of the space between the wing and the engine, thereby permitting the maximum vertical dimension in the strut. The engine mount includes a yoke and means for mounting the yoke to the strut such that the yoke is capable of pivotal movement about an axis transverse to the axis of the engine core. The yoke includes a first arm having a first link attached thereto by means of a pin parallel to the engine axis; the second end of the link is pivotally attached to a mounting ring on the engine core by means of a spherical bearing. A second arm of the yoke extends in a direction opposite to the first arm and has a second link attached between the second arm and the engine mounting ring. A first end of the second link is attached to the second arm of the yoke by means of a pin parallel to the engine axis and the second end of the link is attached to the engine-mounting ring by a spherical bearing. A third link is mounted between the central portion of the yoke and the engine-mounting ring, the first end of the third link being affixed to the yoke by means of a spherical bearing and the second end of the third link being attached to the mounting ring, also by means of a spherical bearing. The first and second links are arranged such that their longitudinal axes are at an angle approximately 60 degrees from the horizontal and such that their first ends converge upwardly toward one another. The spherical bearings of the first and second links and the mounting means mounting the yoke to the strut accommodate longitudinal growth of the engine due to thermal expansion while providing sufficient stiffness to the strut and engine mount assembly to react against the side and seizure loads of the engine. The length of the links is such that the yoke and link assembly lies within the smooth contour of the engine cowling, thereby lessening aerodynamic drag.

BRIEF DESCRIPTION OF THE DRAWINGS

The features and advantages of the present invention will be better understood by those of ordinary skill in the art and others upon reading the ensuing specification when taken in conjunction with the appended drawings, wherein:

FIG. 1 is a rear elevational view of an aft engine mount made in accordance with the principles of the present invention;

FIG. 2 is a cross-sectional view along the line 2—2 in FIG. 1 of a portion of the engine mount assembly of FIG. 1;

FIG. 3 is a cross-sectional view along the line 3—3 in FIG. 1 of a portion of the engine mount of FIG. 1;

FIG. 4 is a detailed view in partial section of a portion of the engine-mounting assembly of FIG. 1; and FIG. 5 is a somewhat schematic view of the engine mount assembly of FIG. 1 showing the reaction to engine seizure loads.

DETAILED DESCRIPTION OF THE PREFERRED EMBODIMENT

FIG. 1 illustrates one embodiment of an engine mount for a jet engine made in accordance with the principles of the present invention. The engine mount is attached to an engine-mounting strut 10, a portion of which is viewed in FIG. 1. The strut 10 is of conventional construction and is affixed at its upper end to the wing structure (not shown) of an aircraft. A mounting fixture 12 is attached to the lower surface of the engine-mounting strut by conventional bolts 14 and 16 having barrel nuts 18 and 20 threadably engaged on the upper ends thereof to secure the mounting fixture to the strut. The engine mount includes a yoke assembly 22 mounted to the mounting fixture 12 such that it hangs from the strut 10. The yoke assembly 22 includes first and second mounting flanges 24 and 25, which are respectively sandwiched between cooperating flange pieces 26a and 26b, and a matching set of cooperating flange pieces 28a and 28b extending downwardly from the mounting fixture 12. The first mounting flange 24 is kept captive between the flange pieces 26a and 26b by a pin 31 held in place by a nut 32 and the second mounting flange 25 is kept in place between the flange pieces 28a and 28b by a similar pin 34, which passes through the flanges and is held in place by a threadably engaged nut 36. The pins 31 and 34 are oriented substantially transversely to the longitudinal axis of the engine so that they permit some pivotal motion about an axis transverse to the engine axis but react against side motion of the engine mount assembly.

The engine core (not shown) includes a mounting ring 38 affixed to the engine core and including mounting ears 40, 42, and 44 extending from the ring 38. A first arm 46 of the yoke assembly 22 is attached at a first end thereof to the mounting ear 40 by means of a first link 48. The first end 48a of the first link 48 is pinned to the first end of the arm 46 by a pin 50 substantially parallel to the engine axis. A spherical bearing 52 is inserted between the second end 48b of the link 48 and the mounting ear 40. Similarly, a second link 54 is attached between a second arm 56 of the yoke assembly and the mounting ear 44 of the mounting ring. A second pin 58 passes through the first end of the second arm 56 and the first end 54a of the second link to pivotally attach the link to the arm 56. The pin 58 is oriented substantially parallel to the engine axis. A second spherical bearing 60 is inserted between the second end of the link 54b and the ear 44.

The mounting ear 42 is positioned approximately at the center of the yoke assembly 22 and is attached to the central portion of the yoke assembly by means of a third link 62. The first end 62a of link 62 is attached to the yoke by means of a spherical bearing 64 and a second end 62b of the third link is attached to the ear 42 by a spherical bearing 66. FIG. 3 illustrates a typical spherical bearing 64 and its attachment to the third link 62. The pins 31 and 34 that mount the yoke assembly to the mounting plate 12 and the spherical bearings 52, 60, 64, and 66 permit sufficient fore/aft movement of the mounting assembly with respect to the strut to accommodate for longitudinal growth of the engine due to thermal expansion. In a typical engine, the longitudinal growth can be as much as 0.6 inches. The first and second links 48 and 54, respectively, are arranged in the preferred embodiment at an angle of approximately 60 degrees to the horizontal and the first ends 48a and 54a of the links converge upwardly toward one another. The angle of the links is critical for reacting engine seizure moment and nacelle side loads. The imposed loads on the engine are directly related to the magnitude of the angle of the links 48 and 54 and the engine deflection is a direct result of the imposed reactions on the engine. It is desirable to have a greater angle $\theta$, however, with the links arranged at an angle of approximately 60 degrees, it is necessary to shorten the links in order to keep the mount assembly within the contours of the engine cowling shown in outline as line 68. In the embodiment pictured in FIG. 1, the spherical bearings and pivot pins 31 and 34 permit enough fore/aft motion to accommodate for engine expansion with a minimum length of links such that the angle of the link can be increased without exceeding the contour of the engine cowling.

FIG. 4 illustrates the details of the structure of the mounting of the yoke assembly 22 to the mounting fixture 12. The pins 31 and 34 fit within bushings 71 and 73. It should be noted that a shim 70 is placed between the head of the pin 34 and the flange piece 28a to prevent any sideways play of the yoke assembly 22. There is no shim associated with the other side of the mount and a gap is left between the head of the pin 31 and the flange piece 26b to allow for thermal growth of the yoke 22. Anti-rotation devices 72 and 74, respectively, are affixed to the fixture 12 and surround the heads of the pins 31 and 34 in order to prevent unwanted rotation of the pins that could lead to loosening of the nuts 32 and 36.

FIG. 5 illustrates how the engine seizure loads are reacted by links 48 and 54. The larger the angle $\theta$, the longer the moment arm L, which provides for greater stiffness in the mount, while still retaining the ability to accommodate engine growth. Lessening of the angle $\theta$ of the respective links 48 and 54 reduces the length of the moment arm L and reduces the ability of the mount to react to engine seizure loads.

The mount made in accordance with the principles of the present invention and illustrated herein combines both the fore/aft flexibility necessary to accommodate longitudinal growth with the stiffness required to react vertical and side loads within the design constraints of the aircraft and engine combination. An angle $\theta$ of approximately 60 degrees is found to be near the optimum in providing the necessary stiffness. While a preferred embodiment of the engine mount made in accordance with the present invention has been described and illustrated, it will be apparent to those persons of ordinary skill in the art that changes can be made to the illustrated embodiment while remaining within the scope of the present invention. For example, a single long pin could be used in place of the two strut pins 31 and 34 to mount the yoke assembly to the mounting fixture. Also, while 60° is the optimum for the angle $\theta$, the links could be set at other angles. Therefore, the invention should be defined solely by reference to the appended claims.

The embodiments of the invention in which an exclusive property or privilege is claimed are defined as follows:

1. In an aircraft having a jet engine mounted to and beneath a wing thereof wherein said engine is a predetermined distance from said wing and wherein further said engine is mounted on a strut affixed to said wing, a low-profile engine mount assembly attachable to said strut and said engine to hold said engine on said strut, said engine mount assembly constructed and arranged to occupy a minimum portion of the distance between said engine and said wing so as to provide the maximum strut vertical dimension so as to keep said engine mount within the contour of a cowl surrounding said engine, said engine mount assembly including a yoke assembly having a first arm and a second arm, yoke-mounting means for mounting said yoke assembly to said strut so as to permit pivotal movement of said yoke about an axis substantially orthogonal to the axis of said engine, and means for mounting said first and second arms of said yoke assembly to said engine including a mounting ring affixed to said engine, first link means pivotally attached at a first end thereof to said first arm and pivotally attached at a second end thereof to said mounting ring, second link means pivotally attached at a first end thereof to said second arm and pivotally attached at a second end thereof to said mounting ring, said first ends of said first and second links being pivotable about axes substantially parallel to said engine axis and said second ends of said first and second links being substantially universally pivotable.

2. The engine mount assembly of claim 1, further including first and second spherical bearing means respectively associated with said second ends of said first and second links and cooperable therewith to attach said first and second links to said mounting ring.

3. The engine mount assembly of claim 2, further including first and second pivot pins associated respectively with the first ends of said first and second links and cooperable therewith to attach said links to said first and second arms of said yoke assembly, said first and second pivot pins being oriented such that their respective axes are substantially parallel to the engine axis.

4. The engine mount assembly of claim 3, further including a third link pivotally attached at a first end thereof to said yoke assembly intermediate said first and second arms and pivotally attached at a second end thereof to said mounting ring intermediate the point of attachment of said first and second links to said mounting ring.

5. The engine mount assembly of claim 4, further including a third spherical bearing means associated with a first end of said third link and cooperable with said yoke assembly to attach said third link to said yoke assembly and a fourth spherical bearing means associated with said second end of said third link and cooperable with said mounting ring to attach said link to said mounting ring.

6. The engine mount assembly of claim 1, wherein said first and second links are substantially elongate and oriented such that they form an angle between 45 and 90 degrees with the horizontal, said first and second links being further oriented such that their first ends converge toward one another.

7. The engine mount assembly of claim 6, wherein said first and second links are at an angle of substantially 60 degrees with respect to the horizontal.

8. The engine mount assembly of claim 1, wherein said yoke-mounting means includes a strut plate affixed to a lower surface of said strut, said strut plate including first and second pairs of flange pieces extending downwardly from said strut plate, first and second strut-mounting flanges integrally formed with and extending upwardly from said yoke assembly and cooperable with said first and second pairs of flange pieces, first and second yoke-mounting pins associated respectively with said first and second pairs of flange pieces, said first and second yoke-mounting pins being arranged such that their axes are substantially orthogonal to the engine axis and such that said first and second yoke-mounting pins are substantially coaxial with one another.

9. The engine mount assembly of claim 8, wherein said yoke-mounting pins are threaded at a first end thereof and further including a nut associated with each of said yoke-mounting pins threadably engaging said yoke-mounting pins to hold said strut-mounting flanges adjacent said flange pieces.

10. The engine mount assembly of claim 9, wherein said yoke-mounting means futher includes shim means associated with one of said yoke-mounting pins to prevent motion of said yoke in a direction along the axis of said yoke-mounting pin.

11. The engine mount assembly of claim 10, further including anti-rotation means associated with said strut plate and said first and second yoke-mounting pins to prevent rotation of said strut-mounting pins.

* * * * *